(12) United States Patent
Hussain et al.

(10) Patent No.: US 7,863,865 B2
(45) Date of Patent: Jan. 4, 2011

(54) SYSTEMS AND METHODS FOR PULSE CHARGING A BATTERY

(75) Inventors: M. Abid Hussain, Los Altos, CA (US); William Cho, Seoul (KR); Daryl Sugasawara, San Jose, CA (US); Takashi Kanamori, San Jose, CA (US)

(73) Assignee: Summit Microelectronics, inc., Sunnyvale, CA (US)

( * ) Notice: Subject to any disclaimer, the term of this patent is extended or adjusted under 35 U.S.C. 154(b) by 360 days.

(21) Appl. No.: 12/181,231

(22) Filed: Jul. 28, 2008

(65) Prior Publication Data

US 2009/0121684 A1 May 14, 2009

Related U.S. Application Data

(60) Provisional application No. 60/962,189, filed on Jul. 26, 2007.

(51) Int. Cl.
*H02J 7/04* (2006.01)
*H02J 7/16* (2006.01)

(52) U.S. Cl. ...................................... 320/140; 320/138
(58) Field of Classification Search .......... 320/138–140
See application file for complete search history.

(56) References Cited

U.S. PATENT DOCUMENTS 5,793,184 A * 8/1998 O'Connor ................... 320/101
6,747,444 B2 * 6/2004 Balakrishnan et al. ...... 323/285
7,535,122 B2 * 5/2009 Visairo-Cruz et al. ......... 307/80
7,560,898 B1 * 7/2009 Kranzen et al. ............. 320/107
7,570,020 B1 * 8/2009 Kranzen et al. ............. 320/128

* cited by examiner

*Primary Examiner*—Edward Tso
*Assistant Examiner*—Ramy Ramadan
(74) *Attorney, Agent, or Firm*—Chad R. Walsh; Fountainhead Law Group PC (57) ABSTRACT

Embodiments of the present invention include techniques for charging a battery. In one embodiment, the present invention includes a method comprising determining if a maximum current output of a power source is above a threshold, configuring a regulator coupled to the power source, wherein the regulator is configured in a pass mode if the maximum current output is above the threshold, and wherein the regulator is configured in a regulation mode if the maximum current output is below the threshold, and generating pulses to a battery, wherein an output of the regulator is coupled to the battery when a pulse is being generated, and the output of the regulator is decoupled from the battery when a pulse is not being generated. In other embodiments, the techniques may be embodied in a circuit including a detection circuit and a switching regulator coupled to a battery through a pulse circuit.

25 Claims, 11 Drawing Sheets

SYSTEMS AND METHODS FOR PULSE CHARGING A BATTERY

CROSS REFERENCE TO RELATED APPLICATIONS

This invention relates to and claims priority from U.S. Provisional Patent Application No. 60/962,189 filed Jul. 26, 2007 naming M. Abid Hussain, William Cho, Daryl Sugasawara, and Takashi Kanamori as inventors, the contents of which is hereby incorporated herein by reference in its entirety.

BACKGROUND

The present invention relates to providing power to electronic devices, and in particular, to systems and methods for charging a battery from different power sources.

Electronic devices require power in the form of voltages and currents to operate. Different electronic systems may require a wide variety of power sources with different voltages and currents to operate. For example, some power sources produce AC voltages and currents and others may produce DC voltages and currents. For AC power sources, the voltages and currents of the power source may be in some specified range (e.g., 110V AC or 220V AC). Similarly, a DC power source may produce DC voltage and DC currents according to certain ratings of the particular source (e.g., 5 volts and 500 mA). However, the ratings of different power sources from different manufacturers may vary widely. Accordingly, powering an electronic device from different power sources typically requires different power input connections and circuitry tailored to process particular voltages and currents from a specific power source.

One area where power source characteristics are important is in battery charging. Batteries have long been used as a source of power for mobile electronic devices. Batteries provide energy in the form of electric currents and voltages that allow circuits to operate. However, the amount of energy stored in a battery is limited, and batteries lose power when the electronic devices are in use. When a battery's energy supply becomes depleted, the battery's voltage will start to fall from its rated voltage, and the electronic device relying on the battery for power will no longer operate properly.

Many types of batteries are designed for a single use. Such batteries are discarded after the charge is depleted. However, some batteries are designed to be rechargeable. Rechargeable batteries typically require some form of battery charging system. Typical battery charging systems transfer power from a power source into the battery. The recharging process typically includes processing and conditioning voltages and currents from the power source so that the voltages and currents supplied to the battery meet the particular battery's charging specifications. For example, if the voltages or currents supplied to the battery from the power source are too large, the battery can be damaged or even explode. On the other hand, if the voltages or currents supplied to the battery from the power source are too small, the charging process can be very inefficient or altogether ineffective. Accordingly, the characteristics of the power source play an important role in battery charging. Circuitry coupled between the power source and battery must be tailored to optimized battery charging. Otherwise, inefficient use of the battery's charging specification can lead to very long charging times, for example. Additionally, if the charging process is not carried out efficiently, the battery's cell capacity (i.e., the amount of energy the battery can hold) may not be optimized.

One problem associated with charging a battery pertains to the availability of different types of power sources with different voltage and current characteristics. It would be desirable to have a simple system that can efficiently process the voltages and currents available from different power sources into voltages and currents that may be used to charge a battery. Thus, there is a need for improved systems and methods for charging batteries from different power sources.

SUMMARY

Embodiments of the present invention include techniques for charging a battery using pulses. In one embodiment, the present invention includes a circuit that may be used to charge a battery. The circuit may be an integrated circuit, for example. In one embodiment, the circuit includes a regulator having an input coupled to a power source, a detection circuit for detecting one or more characteristics of the power source, the detection circuit being coupled to the regulator for configuring the regulator into one of a plurality of modes, and a pulse circuit coupled between the regulator and a battery, wherein the regulator operates in a pass mode if a first power source type is detected, and wherein the regulator operates in a regulation mode if a second type of power source is detected.

In one embodiment, the circuit further comprises a current limit circuit, wherein, in pass mode, a current limit is set above a maximum current output of the power source, and wherein, in regulation mode, the current limit is set below the maximum current output of the power source.

In one embodiment, the regulation mode comprises a buck mode and a boost mode.

In one embodiment, the regulator is a switching regulator.

In one embodiment, in regulation mode, the switching regulator is configured in a buck mode if a pulse is being generated.

In one embodiment, in regulation mode, the switching regulator is configured in a boost mode if a pulse is not being generated.

In one embodiment, a voltage on an output of said switching regulator alternates between a first voltage greater than a power source voltage and a second voltage on the battery.

In one embodiment, wherein, in regulation mode, the detection circuit determines if a voltage on the output of the switching regulator is greater than a voltage on the input of the switching regulator.

In one embodiment, in regulation mode, the switching regulator generates a constant current into the battery when the pulse is being generated.

In one embodiment, the regulator is a linear regulator.

In one embodiment, the detection circuit compares a power source voltage to a threshold voltage.

In one embodiment, the detection circuit detects a short circuit between a first terminal and a second terminal.

In another embodiment, the present invention includes a method comprising determining if a maximum current output of a power source is above a threshold, configuring a regulator coupled to the power source, wherein the regulator is configured in a pass mode if the maximum current output is above the threshold, and wherein the regulator is configured in a regulation mode if the maximum current output is below the threshold, and generating pulses to a battery, wherein an output of the regulator is coupled to the battery when a pulse is being generated, and the output of the regulator is decoupled from the battery when a pulse is not being generated.

In one embodiment, configuring the regulator comprises setting a current limit in the regulator above the maximum current output in pass mode, and setting the current limit in the regulator below the maximum current output in regulation mode.

In one embodiment, the regulator is a switching regulator.

In one embodiment, in regulation mode, the switching regulator is configured in a buck mode if a pulse is being generated.

In one embodiment, in regulation mode, the switching regulator is configured in a boost mode if a pulse is not being generated.

In one embodiment, a voltage on an output of said switching regulator alternates between a first voltage greater than a power source voltage and a second voltage on the battery.

In one embodiment, the method further comprises, in regulation mode, detecting if a voltage on the output of the switching regulator is greater than a voltage on the input of the switching regulator.

In one embodiment, in regulation mode, the switching regulator generates a constant current into the battery when the pulse is being generated.

In one embodiment, said determining step comprises comparing a voltage from the power source to the threshold, and wherein the threshold is a voltage.

In one embodiment, said determining step comprises detecting a short circuit between a first terminal and a second terminal.

In one embodiment, a voltage on an output of said regulator alternates between a power source voltage and a voltage on the battery.

In one embodiment, the method further comprises sensing an output voltage at an output of the regulator, and generating said pulses when a voltage is sensed.

The following detailed description and accompanying drawings provide a better understanding of the nature and advantages of the present invention.

DISCLOSURE

Described herein are techniques for battery charging systems and methods. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include obvious modifications and equivalents of the features and concepts described herein.

Figure 1:
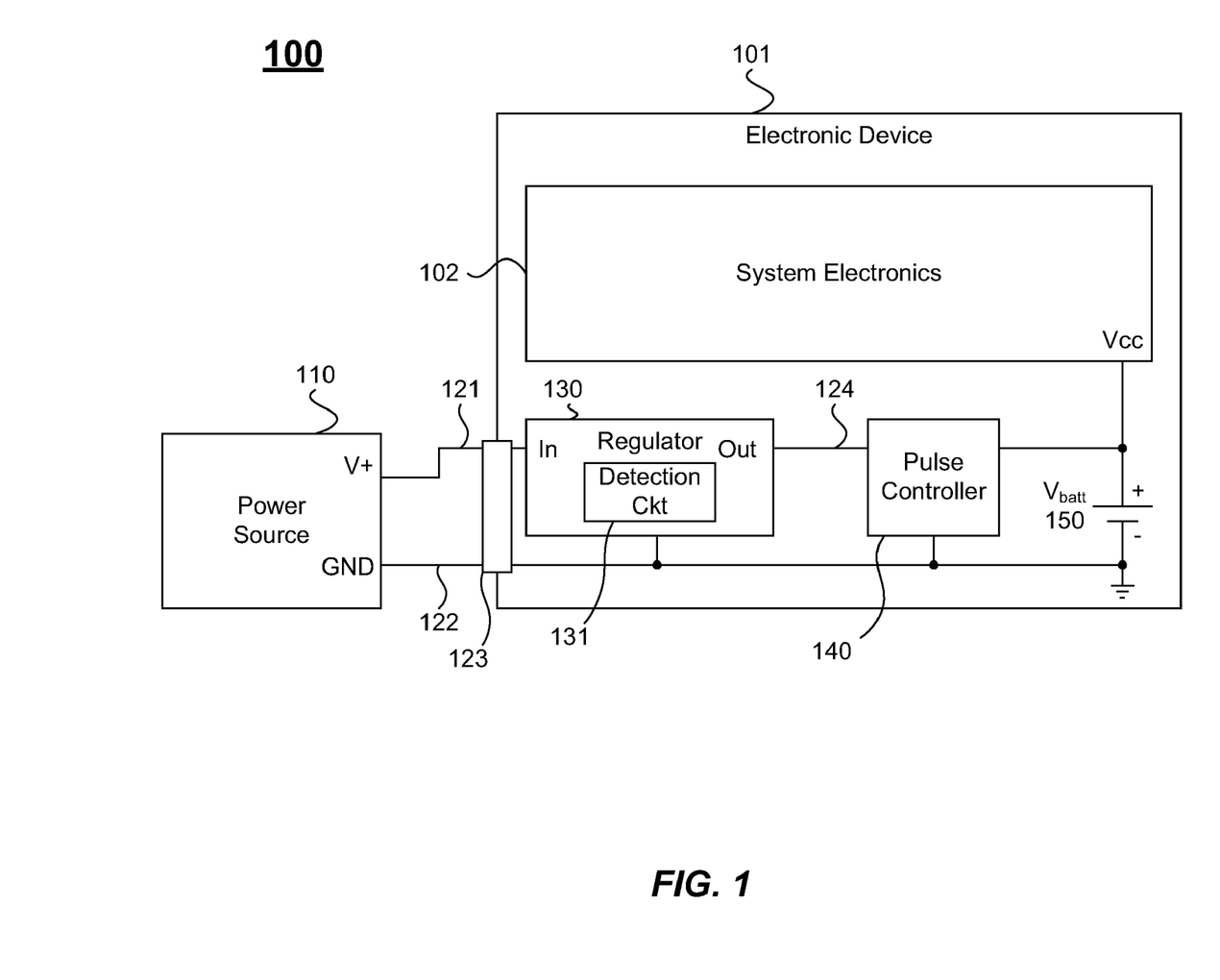
FIG. 1 illustrates an electronic device with a battery charger circuit according to one embodiment of the present invention.

FIG. 1 illustrates an electronic device including a battery charger according to one embodiment of the present invention. System 100 includes electronic device 101 comprising system electronics 102, a regulator 103, a pulse controller circuit 140, and a battery 150. Regulator 130 in electronic device 101 is coupled to a power source 110 through a physical connector 123. In this example, regulator 130 includes a power source detection circuit 131 for determining the type of power source connected to the electronic device. It is to be understood that the detection circuit may be integrated with the regulator or provided as an external circuit block. System electronics 102 may include microprocessors, microcontrollers, wireless electronics, network electronics, or a variety of other analog or digital electrical circuits that may be powered by battery 150. The electronic device may be a mobile system, portable phone (e.g., a cellular phone), a personal digital assistant ("PDA"), a portable music or video player, or a variety of other mobile devices that may be powered by a battery.

Regulator 103 may include an input terminal 121 coupled to a power source 110 for receiving voltage and current from the power source. Example regulators are linear regulators or switching regulators, for example. Switching regulators may further include filters (e.g., inductors) coupled between the regulator output and the battery, for example. Features and advantages of the present invention include coupling different types of power sources to electronic device 101, and therefore to regulator 103, and processing the different voltages and currents from the different power sources to charge the battery using pulse mode charging. In a pulse mode battery charging system, the pulse controller circuit 140 receives voltage and current and couples the voltage and current to the battery as pulses of energy. For example, in one specific implementation the energy delivered to the battery may be controlled by changing the pulse width (the time duration) of the pulses generated by the pulse controller circuit 140. It is to be understood that other pulse mode techniques could also be used. In this example, regulator 103 includes an output terminal 124 coupled to pulse controller circuit 140. Pulse controller circuit 140 receives the output voltage and current from regulator 130 and generates pulses that are used to charge battery 150. The power source, regulator, pulse circuit, and battery may be, for example, coupled to a common ground reference by terminal 122. Detection circuit 131 detects the type of power source coupled to regulator 130. As described in more detail below, detection of the power source type may be used to configure the regulator in different operating modes, such as a pass mode or a regulation mode, to improve battery charging.

For example, in one embodiment, if a power source type with a current output capability above a threshold is detected (e.g., a high current output type power source such as an AC-to-DC adapter power source), then the regulator is configured into a pass mode. In pass mode, the voltage and current from the power source may be coupled to the output of the regulator and to the input of the pulse circuit. The voltages and currents from the power source may be coupled through the regulator without being processed, for example, and delivered to the pulse circuit. If the power source type is determined to have an output current capability below a threshold (e.g., a USB port having a limited current output), then the regulator is configured into a regulation mode. The regulation mode used may depend on the type of regulator used. In one embodiment using a switching regulator, the regulation mode may include a "boost mode" (i.e., wherein the output voltage of the regulator is greater than the input voltage of the regulator), a "buck mode" (i.e., wherein the output voltage of the regulator is less than the input voltage of the regulator), or both. In another embodiment using a linear regulator, the regulation mode may include in a low dropout mode ("LDO"), for example. It is to be understood that a variety of parameters may be sensed to detect different power source types to determine how best to process the voltages and currents received from the power source as illustrated by the example implementations below.

Figure 2:
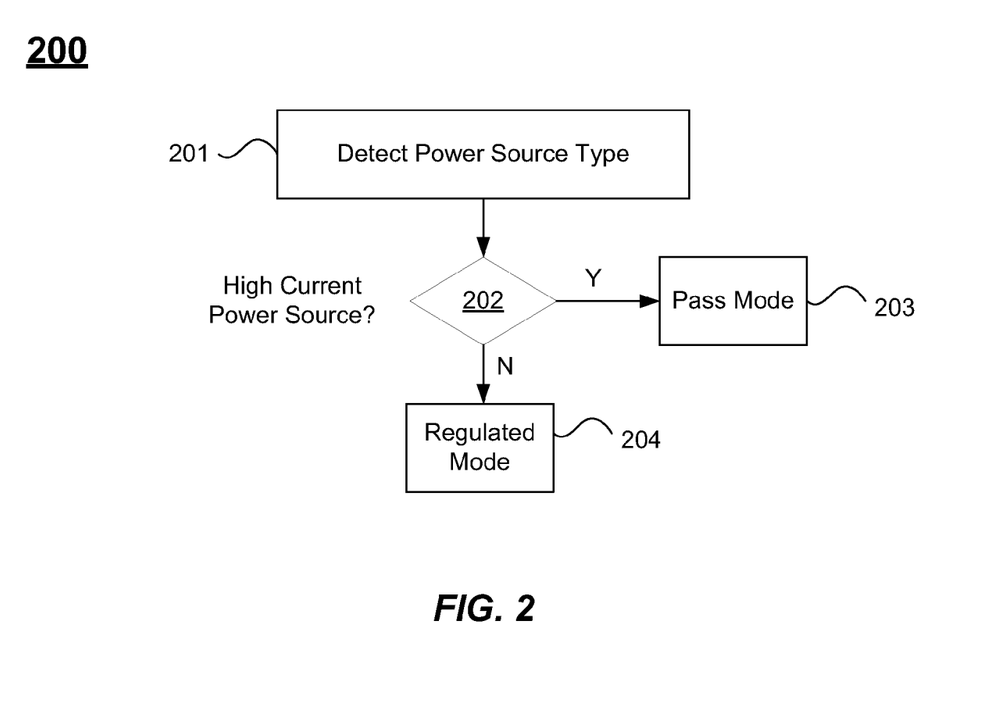
FIG. 2 illustrates a method of charging a battery according to another embodiment of the present invention.

FIG. 2 illustrates a method of charging a battery according to another embodiment of the present invention. As mentioned above, embodiments of the present invention may detect the type of power source being connected to an electronic device and configure the circuitry differently based on the power source type. For example, if the input of an AC-to-DC adapter is plugged into a wall socket to receive AC power, the output of the AC-to-DC adapter ("AC Adapter") may provide DC voltage and current having a variety of characteristics (i.e., the DC voltage and current capabilities of different adapters can vary from adapter to adapter). Since the power is being generated from a wall plug, an AC Adapter will typically be able to output a large amount of current (e.g., 1000 mA). If the output of an AC Adapter is coupled to the input of regulator 130 through a connector 123, the system may detect the power source type at 201. For example, detection circuit may determine whether or not the power source is a high current power source (e.g., an AC Adapter) at 202. If a high current power source is detected, then the system may be configured in a pass mode at 203, wherein the voltage and current from the power source are coupled to the input of pulse controller circuit 140. In one embodiment, when a high current power source is detected, a current limit in regulator 130 may be set above the current available from the power source so that the maximum current available may be delivered ("passed") to the pulse circuit. Alternatively, if the detected power source type is not a high current power source, then the system may be configured in a regulated mode at 204. In a regulated mode, the output voltage or current may be controlled. For example, the current limit may be set at a threshold level below the maximum current available from the power source so that the current drawn from the power source does not exceed the maximum rated current.

Figure 3:
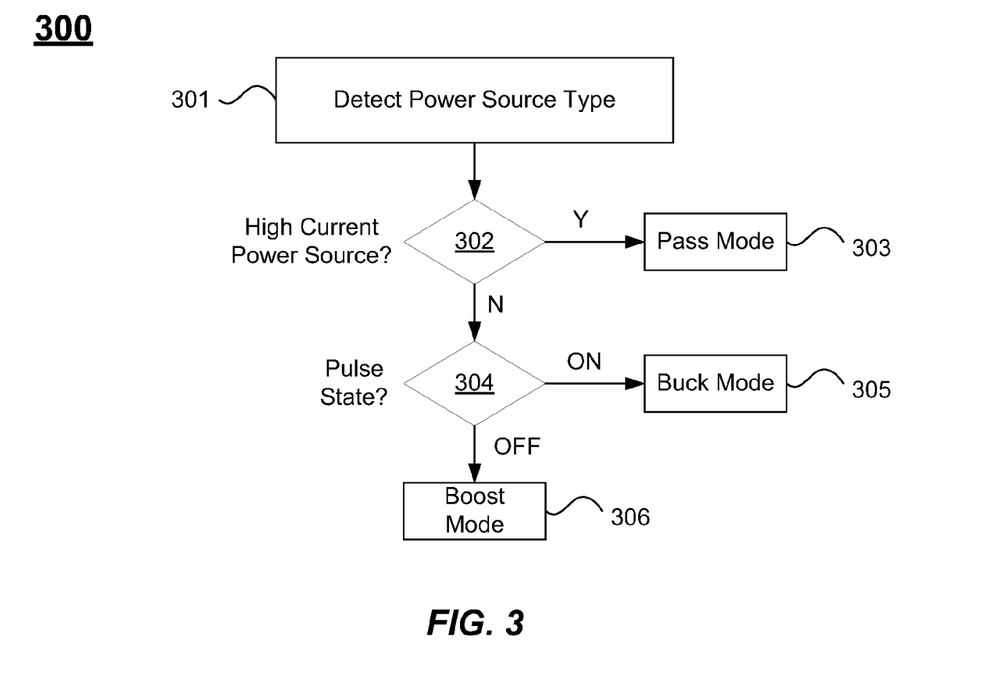
FIG. 3 illustrates a method of charging a battery according to another embodiment of the present invention.

FIG. 3 illustrates a method of charging a battery according to another embodiment of the present invention. In this embodiment, a switching regulator is used. At 301, the power source type is detected. If the system determines that the power source is a high current power source at 302, then the system enters pass mode at 303 and couples the voltage and current from the power source to the input of the pulse controller. At 304, the switching regulator may be configured in either boost mode or buck mode. For instance, if a pulse is being delivered to the battery (ON), then the battery may be coupled to the output of the switching regulator through the pulse controller. Accordingly, the output of the switching regulator may be coupled to a lower voltage than the input of the switching regulator (e.g., if the battery voltage is depleted). In this case, the regulator may be configured into a buck mode 305. Additionally, in some embodiments, the output current provided from the output of the switching regulator to the battery may be larger than the current received by the switching regulator from the power source. An example of this technique is described in more detail below. Similarly, if the pulse controller is not currently delivering a pulse to the battery (OFF), then the output of the switching regulator may experience a high impedance. Accordingly, in one embodiment, the switching regulator may be configured into boost mode at 306.

Figure 4:
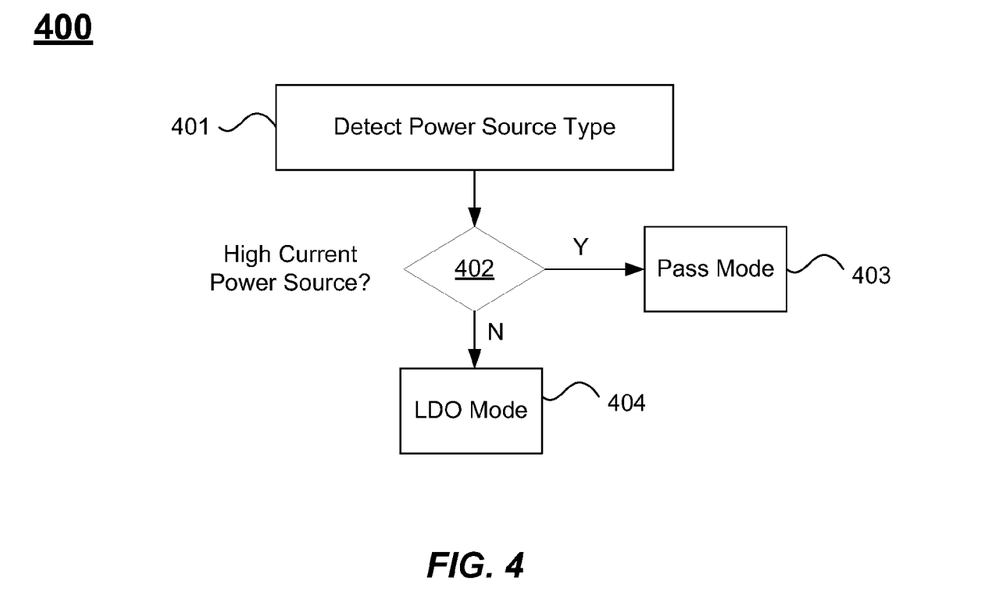
FIG. 4 illustrates a method of charging a battery according to another embodiment of the present invention.

FIG. 4 illustrates a method of charging a battery according to another embodiment of the present invention. In this embodiment, a linear regulator is used. At 401 the system detects the power source type. At 402, the system determines if the power source is a high current power source, such as an AC Adapter. If a high current power source is coupled to the electronic device, then the regulator is configured in pass mode at 403. Alternatively, the regulator may be configured in a low dropout mode, wherein the output of the regulator may be at a lower voltage than the input of the regulator for charging a depleted battery similar to the case described above.

Figure 5A:
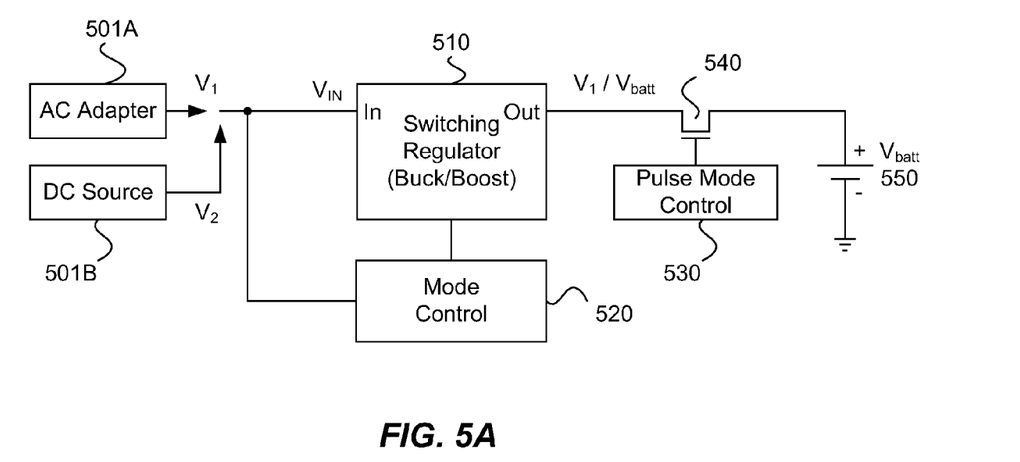
FIGS. 5A-B illustrate a battery charger circuit according to one embodiment of the present invention.
Figure 5B:
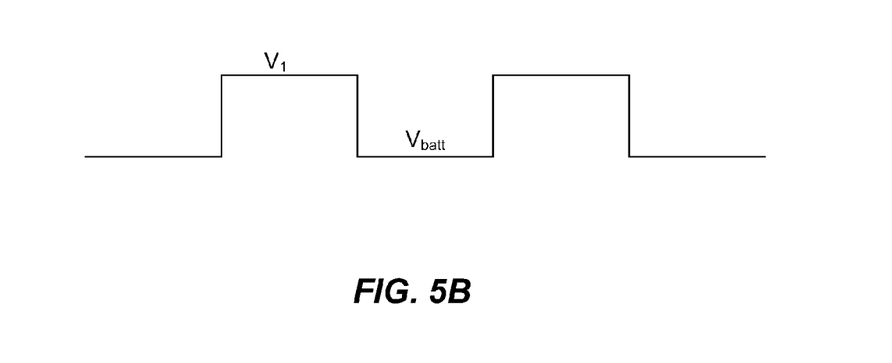

FIGS. 5A-B illustrate a battery charger circuit according to one embodiment of the present invention. In this example, two power sources 501A and 501B may be coupled to the input of a switching regulator 510, the output of which is coupled to a battery 550 through a transistor 540 operated by a pulse mode control circuit 530. In this example, the output voltage V1 of the AC Adapter 501A may be greater than the output voltage V2 of the DC source 501B. Accordingly, if the AC Adapter 501A is coupled to the input of the switching regulator, mode control circuit 520 detects that the input voltage to the regulator is greater than a threshold, Vt, which may be greater than V2 but less than V1 (e.g., Vin>Vt; V2<Vt<V1). If this input voltage level is detected, the system may be configured into a pass mode as described above. Accordingly, the input of the regulator is coupled to the output so that the output is equal to the AC Adapter voltage. Pulse mode control circuit 530 will turn transistor 540 ON and OFF so that pulses of energy are transferred to battery 550. Therefore, as illustrated in FIG. 5B, the output of regulator 510 will alternate between a voltage V1 (the AC Adapter voltage) and the voltage on the battery, Vbatt. The frequency of the pulses shown in FIG. 5B may be much lower than the frequency of the switching signals in the switching regulator. In this case, when transistor 540 is turned ON, the current generated at the output of the AC Adapter power source will increase up to the maximum AC Adapter output current. This current is passed through the regulator (e.g., using a transistor turned ON), through transistor 540, and into the battery.

If the DC source 501B is coupled to the input of switching regulator 510, the maximum output current available from the source may be less than the current available from the AC Adapter, which may reduce the efficiency of battery charging. Accordingly, if the mode control circuit detects a voltage below the threshold Vt, the system may be configured in a boost or buck mode. In one embodiment, if a regulator input voltage is detected that is below a threshold voltage, Vt, then the regulator is configured as a boost regulator. Therefore, the input voltage V2 at the input of the switching regulator may be increased to V1 at the output of the switching regulator. However, if pulse mode control circuit 530 turns ON transistor 540, the voltage at the output of the regulator will drop. Accordingly, if the regulator output voltage is detected that is below the threshold voltage, Vt, then the regulator is configured as a buck regulator. Therefore, the input voltage V2 at the input of the switching regulator may be decreased to the battery voltage, Vbatt, at the output of the switching regulator. In one embodiment, the switching regulator is configured in buck mode and a constant current is driven into the battery through the pulse circuit. Additionally, the current at the output of the switching regulator may be greater than the current at the input of the switching regulator as illustrated in the following equations:

$$Vout*Iout=Eff*Vin*Iin,$$

$$Iout=(Eff*Vin*Iin)/(Vout),$$

Where Vin>Vout and Eff<1. Therefore, when transistor 540 is turned on, the switching regulator may generate more current into the battery than is drawn from the DC source 501B. The current at the output may be reduced automatically as the voltage on the battery increases to maintain the above equation relations.

Example Implementation

Figure 6:
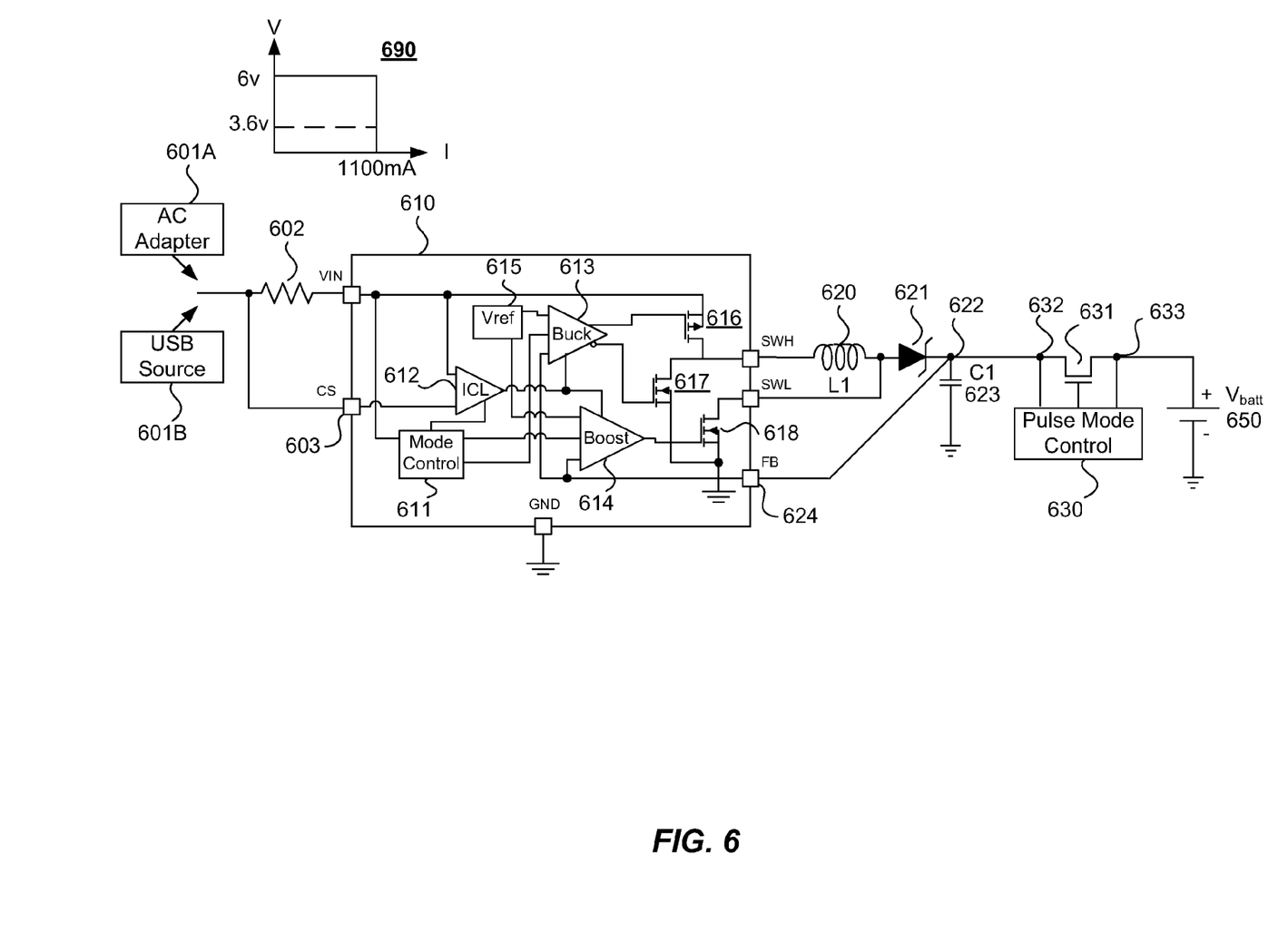
FIG. 6 illustrates a battery charging circuit according to another embodiment of the present invention.
Figure 7A:
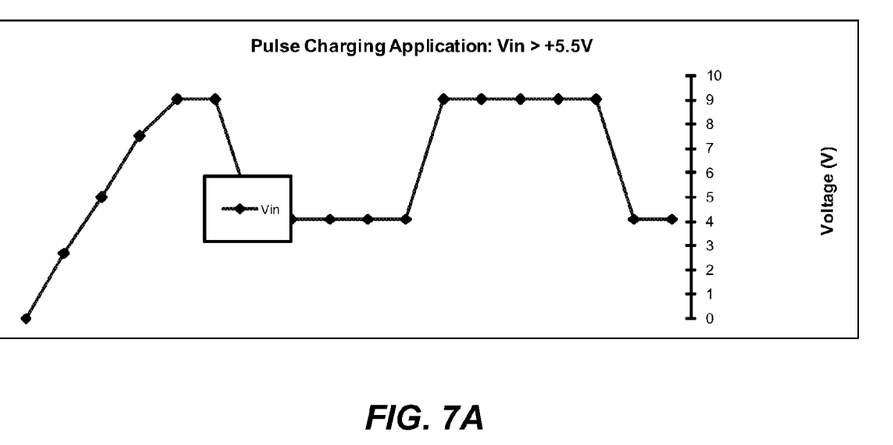
FIGS. 7A-D illustrate the input and output voltages and currents of the switching regulator for an AC Adapter.
Figure 7B:
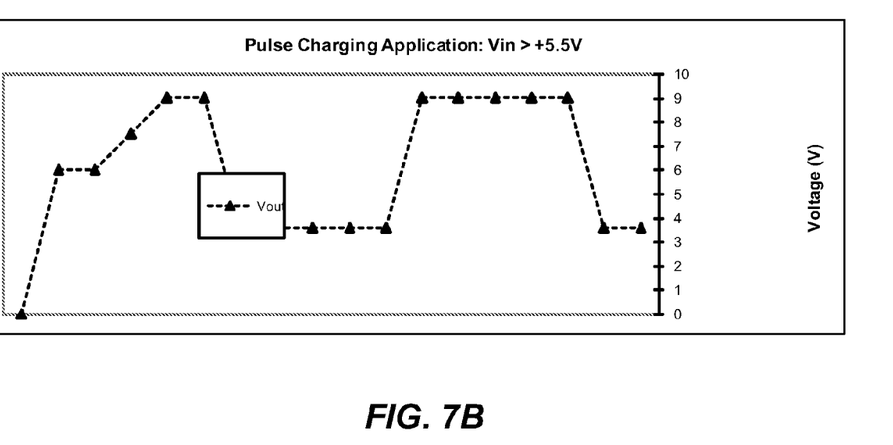
Figure 7C:
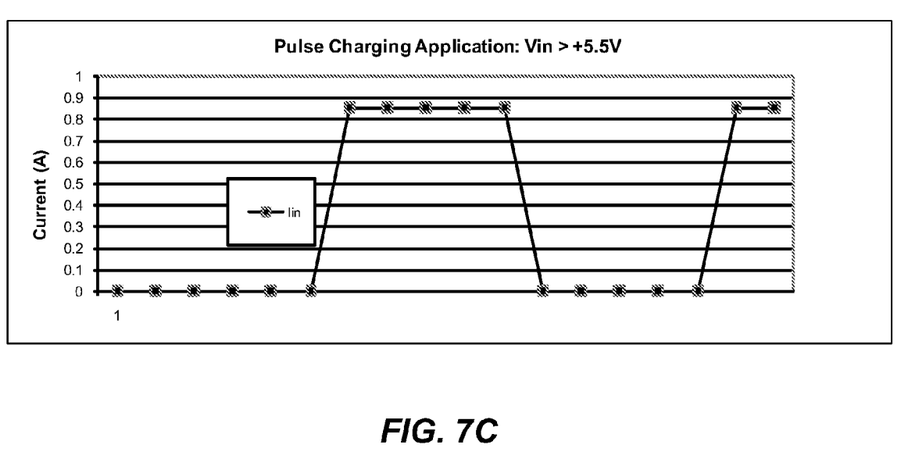
Figure 7D:
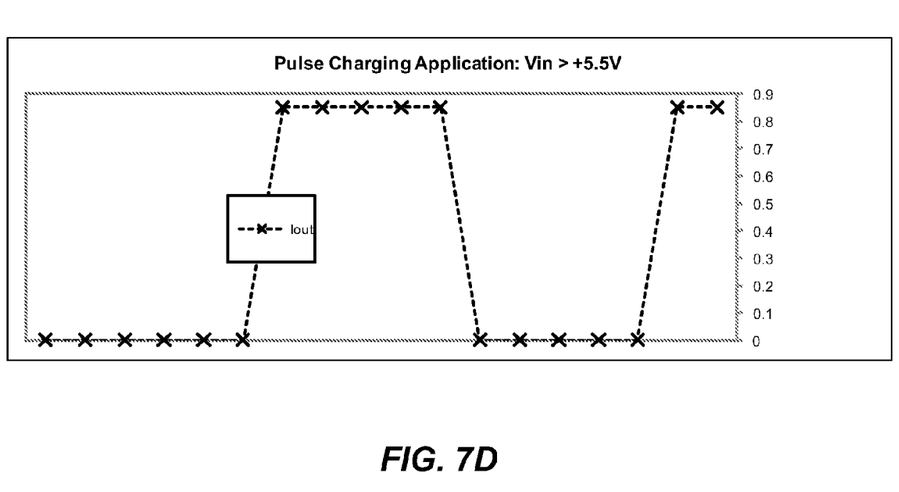
Figure 8A:
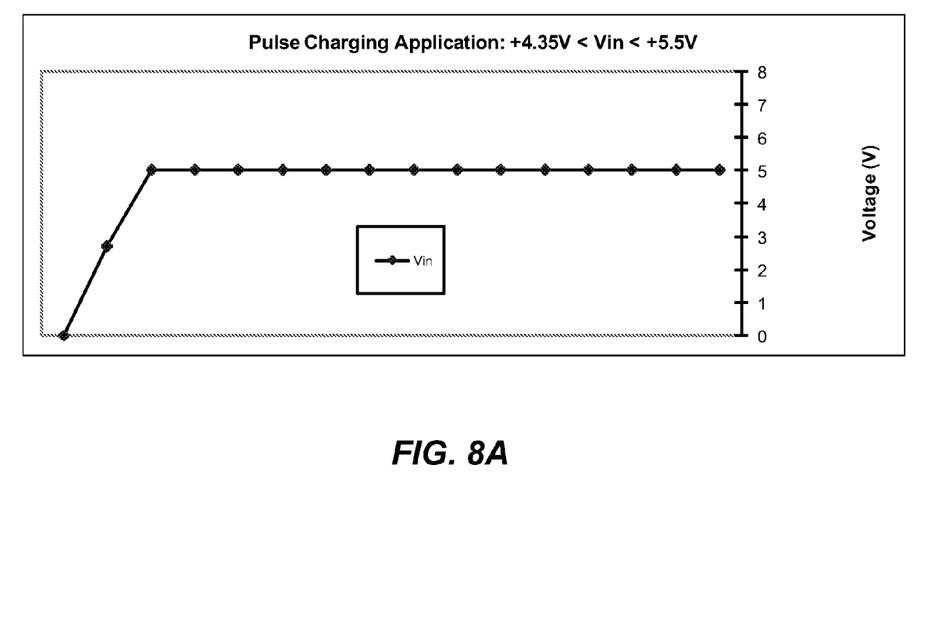
FIGS. 8A-D illustrate the input and output voltages and currents of the switching regulator for an USB power source.
Figure 8B:
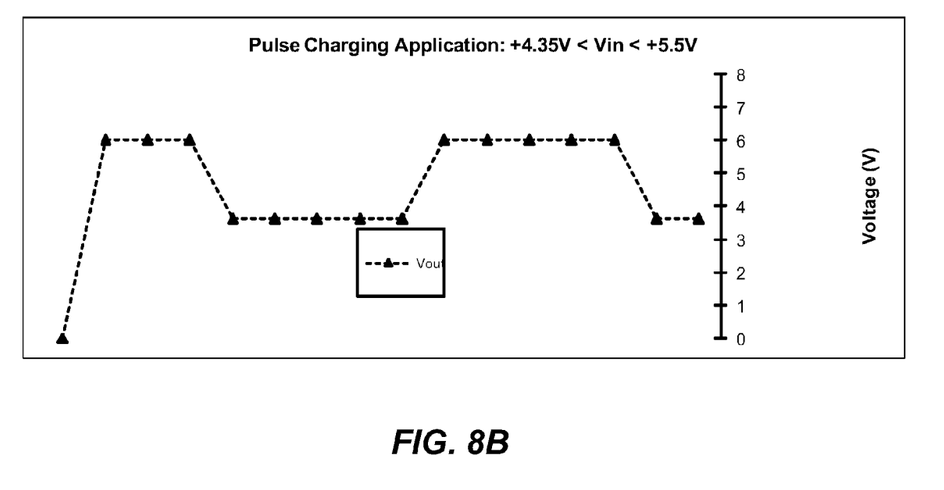
Figure 8C:
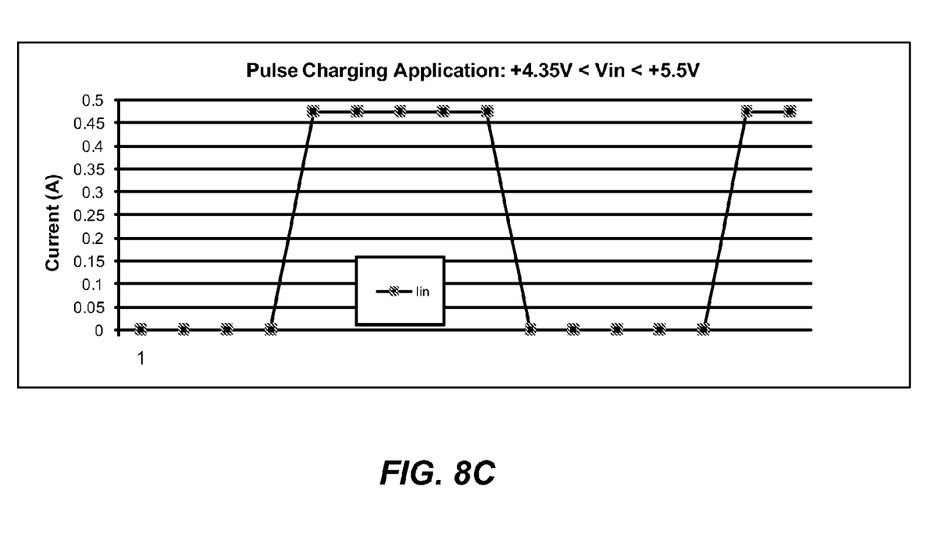
Figure 8D:
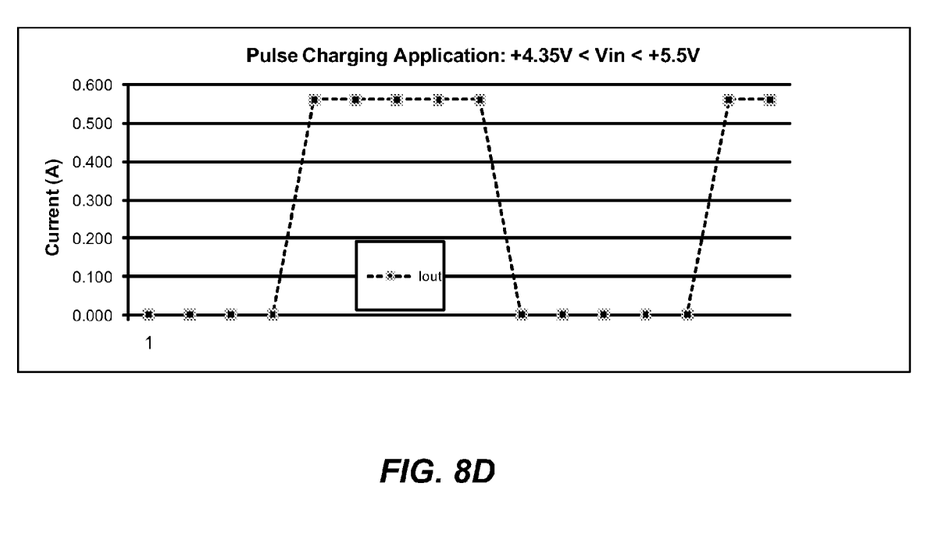

FIG. 6 illustrates a battery charging circuit according to another embodiment of the present invention. In this example, an AC Adapter power source 601A or a Universal Serial Bus ("USB") power source 601B are coupled through a switching regulator and pulse circuit to charge a battery 650. In this example, the AC Adapter may have a current-voltage ("I-V") curve as illustrated by 690, wherein the DC output voltage is constant at 6 volts as the output current increases up to 1100 mA. At 1100 mA, the DC output voltage drops off. USB power source 601B may produce a constant 5 volts with a maximum output current of 500 mA, for example. USB power source capabilities are typically set according to USB standards, such as USB 2.0. Of course, it is to be understood that the particular voltage levels disclosed here are merely examples to illustrate some of the features of the present invention. If AC Adapter 601A is coupled to the input of the charging circuit, a voltage of 6 volts will be received at the input of circuit 610. The voltage and current are coupled through resistor 602, which may be a small resistance resistor for sensing the input current of the switching regulator (i.e., the output current of the power source). In this example, the circuit 610 is an integrated circuit having circuit pins (or just die pads if referring to the silicon die) illustrated by pins such as pins 603 and 624. The AC Adapter voltage of 6 volts is received at the input pin VIN. Input pin VIN is in turn coupled to mode control circuit 611, which performs power source type detection in this example. Mode control circuit 611 determines if the AC Adapter voltage is above a threshold voltage. Here, the threshold voltage is 5.75 volts as an example, which is above the USB voltage and below the AC Adapter voltage. Accordingly, if the mode control circuit detects that the input voltage of circuit 610 is above 5.75 volts, then an AC Adapter is the power source, and the circuit 610 is configured in pass mode. In pass mode, mode control circuit 611 signals circuit 613 to turn ON transistor 616 and turn OFF transistor 617. Similarly, mode control circuit 611 signals circuit 614 to turn OFF transistor 618. Additionally, mode control circuit 611 may reconfigure the input current limit circuit 612, described in more detail below, to a current limit value above the maximum current available from the AC Adapter source so that the current through circuit 610 in pass mode is not held below the maximum available current from the AC Adapter source. This may or may not be required depending on the implementation of the current limit circuitry and the implementation of the circuits 613 and 614. Accordingly, the voltage and current from the AC Adapter power source 601A are "passed" through transistor 616 to the output of circuit 610.

As described in more detail below, the output of circuit 610 is coupled to a first terminal of an inductor 620. The other terminal of inductor 620 is coupled to the anode terminal of a diode 621. The cathode terminal of diode 621 is coupled to a terminal of capacitor 623, which has a second terminal coupled to ground. The cathode terminal of diode 621 is also coupled to the input of the pulse circuit. Accordingly, in pass mode, the voltage and current from AC Adapter 601B are passed through the inductor and diode to the pulse circuit.

In this example, the pulse circuit includes a transistor 631 and a pulse mode control circuit 630. Pulse mode control circuit 630 may include inputs coupled to the input and output terminals of transistor 631 and an output coupled to the control terminal of transistor 631. In pass mode, the AC Adapter voltage of 6 volts will appear at the input terminal 632 of transistor 631. Pulse mode controller 630 may sense this voltage, for example, and initiate pulse charging of the battery by sending signals to the gate of transistor 631 to turn the transistor ON and OFF. The output terminal 633 of transistor 631 is coupled to a terminal of battery 650. If transistor 631 is turned ON and OFF, voltage and current from the AC Adapter will be coupled to the battery 650. If the battery is depleted to 3.6 v, for example, the current generated by the AC Adapter will increase up to 1100 mA and then the voltage will drop off down to 3.6 volts. Accordingly, as transistor 631 is turned ON and OFF, the voltage at the input terminal 632 of transistor 631 will alternate between 6 volts and the battery voltage.

If the USB power source 601B is coupled to the input of the charging circuit, a voltage of 5 volts will be received at the input of circuit 610. Mode control circuit 611 determines if the USB voltage is above a threshold voltage. Here, the USB voltage is below the threshold voltage of 5.75 volts. Accordingly, if the mode control circuit detects that the input voltage of circuit 610 is below 5.75 volts, the circuit 610 is configured in a regulation mode. In this example, the circuit is first configured into boost mode. In boost mode, mode control circuit 611 signals circuit 613 to turn ON transistor 616 and turn OFF transistor 617. Similarly, mode control circuit 611 signals circuit 614 to turn ON and OFF transistor 618 in a controlled manner. For example, feedback pin ("FB") 624 of circuit 610 is coupled to a terminal of capacitor 623 and the cathode of diode 621, which is a DC voltage and current output of the switching regulator. The output voltage on capacitor 623 may be used as a feedback voltage for controlling the signals generated by boost circuit 614 to turn transistor 6180N and OFF. Circuit 610 includes a reference voltage generator 615 that may be coupled to boost circuit 614 and buck circuit 613 together with waveforms from controller 611, such as a sawtooth for example, for generating the switching signals. Circuit 610 may be configured to generate 6 volts at node 622 when in boost mode, for example.

In boost mode, the USB power source voltage of 5 volts will be increase to 6 volts at the input terminal 632 of transistor 631. Pulse mode controller 630 may sense this voltage and initiate pulse charging of the battery. If transistor 631 is turned ON, voltage and current from the boosted voltage from the USB source will be coupled to the battery 650. However, if the battery is 3.6 v, for example, the current generated by the USB source may increase above the maximum rated value of 500 mA and the output of the regulator will drop off down to 3.6 volts. In one embodiment, current limit circuitry may be used to limit the current drawn from the power source. For example, circuit 610 may include sense resistor 602 and current limit circuit 612. Current limit circuit 612 may sense the current (e.g., by sensing the voltage across resistor 602) and adjust buck circuit 613 and/or boost circuit 614 so that the current does not increase above a set value (e.g., 475 mA for a 500 mA USB source). It is to be understood that current limiting may be performed using the input current, as shown here, or the output current. Additionally, current limiting may use sense resistors or other techniques for sensing and controlling the input or output current. In this example, if the USB voltage is detected, mode control circuit may set the current limit at 475 mA.

In one embodiment of the present invention, circuit 610 detects when the pulse circuit begins operating. For example, circuit 610 may, while in boost mode, detects if the voltage at the output drops below a threshold (e.g., 5.75 volts). Such a condition would indicate that the USB source is coupled to the battery through a switching regulator and pulse circuit. Circuit 610 may then be configured into a buck mode. For example, as mentioned above, the switching frequency of the pulse circuit is typically much lower than the switching frequency of the switching regulator. As an example, the switching frequency of the pulse circuit, which is related to the amount of time transistor 631 is turned ON and then OFF, may be 1 KHz, whereas the switching frequency of the switching regulator may be as high as 100 KHz or more. Accordingly, the switching regulator may operate in buck or boost mode for many cycles (of the regulator), thereby changing state to adapt to the state of the pulse circuit.

Additionally, in one embodiment the circuit may provide a constant current in buck mode. If the switching regulator is in buck mode, wherein the input voltage is greater than the output voltage, and if the pulse circuit begins to operate, thereby turning ON transistor 631, the switching regulator may generate more current at the output than is received at the input as described by the equations above. If the input current limit is set close to the maximum current available from the USB source, then the switching regulator will generate more current into the battery than it draws from the USB power source, thereby increasing the effective charging of the battery. The current at the output may be reduced automatically as the voltage on the battery increases so that the energy drawn from the USB power source remains approximately constant. FIGS. 7A-D illustrate the input and output voltages and currents of the switching regulator for an AC Adapter, wherein the input voltage from the power source is greater than some threshold (e.g., 5.5 volts). FIGS. 8A-D illustrate the input and output voltages and currents of the switching regulator for an USB power source, wherein the input voltage from the power source is less than some threshold (e.g., 5.5 volts) but greater than the nominal USB voltage.

Figure 9:
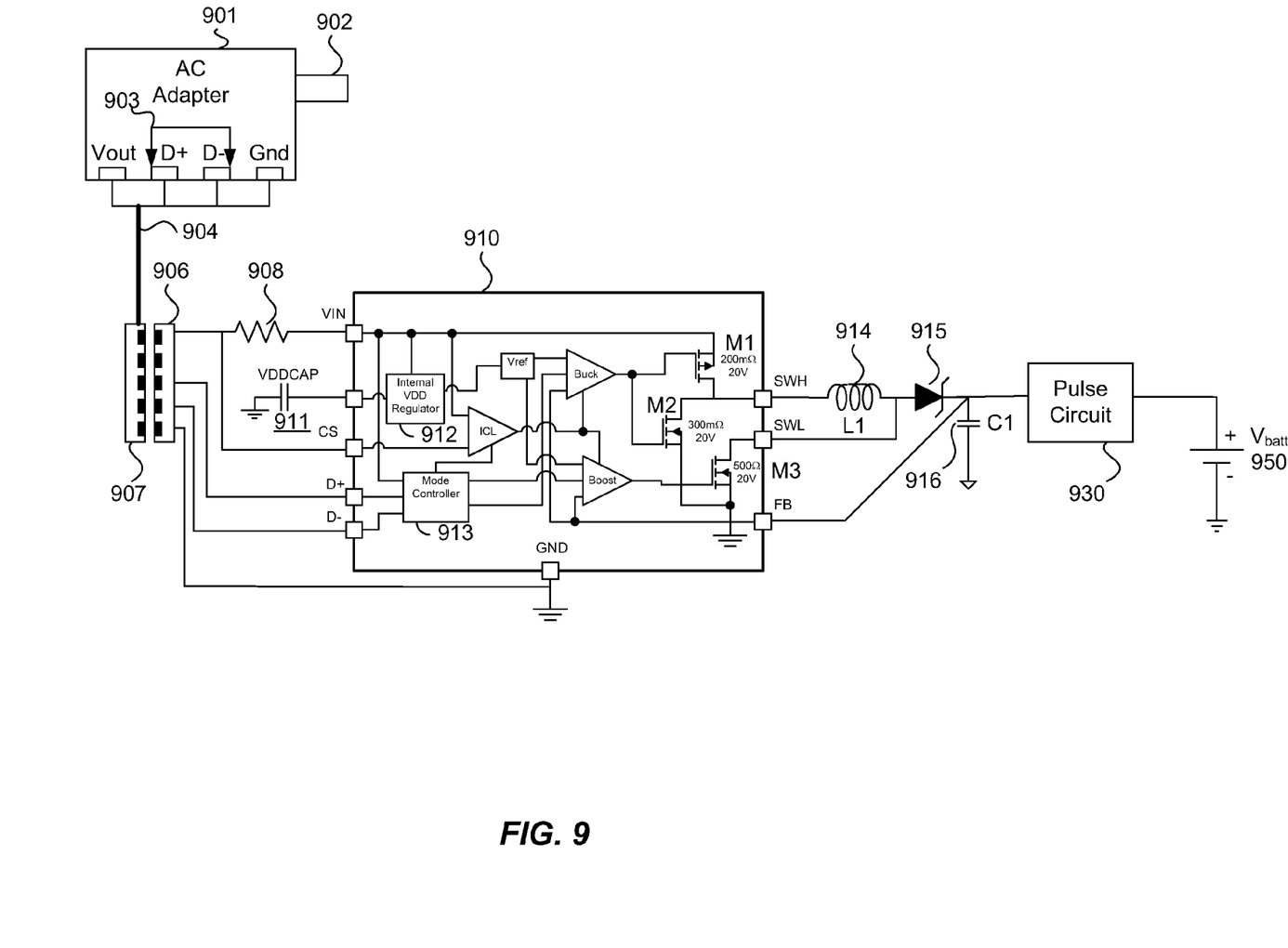
FIG. 9 illustrates a battery charging circuit according to another embodiment of the present invention.

FIG. 9 illustrates a battery charging circuit according to another embodiment of the present invention. In this example, an AC Adapter power source 901 is coupled through a connector to an electronic device including a switching regulator circuit 910, pulse circuit 930 and battery 950. AC Adapter may include plugs illustrated at 902 for plugging into a wall socket to receive high AC voltage and current. The output of AC Adapter 901 includes a DC voltage ("Vout"), ground ("Gnd"), and two terminals D+ and D−. These terminals are connected together in this example to indicate that the power source is an AC Adapter. The outputs of the AC Adapter are coupled to a connector 907 using a bundled wire 904 (multiple wires arranged together). Connector 907 establishes electrical connection with the connector 906 of an electronic device including detection and switching regulator circuit 910 and pulse circuit 930. The Vout terminal of AC Adapter 901 is coupled to the input of circuit 910 through sense resistor 908. Resistor 908 may have a small value such as about 30 mOhms, for example. Circuit 910 includes similar circuits and functionality as circuit 610 in FIG. 6. However, circuit 910 may further include an internal VDD regulator 912, for establishing an internal supply voltage, and VDD supply capacitor 911. Circuit 910 further includes additional pins coupled to the D+ and D− terminals of the AC Adapter 901. These terminals may be coupled together as illustrated at 903 to indicate the power source type. In this example, mode control circuit 913 is coupled to the D+ and D− pins so the power source type can be determined using the shorted D+/D− terminals, if available. At the output of the circuit 910, example impedances of transistor M1, M2, and M3 are illustrated.

The example illustrated in FIG. 9 may be designed as a "pre-regulator" for Li-Ion charging circuits, for example. Features of this example include that the circuit operates in step-down (buck), step-up (boost) or "pass-through" mode, the circuit allows pulse charging and compliance with USB standard limits, the circuit allows for a +4.35V to +20V input range, and the circuit has automatic input detection and input/output mode selection for USB or AC adapter inputs. Additionally, for a USB standard input (such as USB 2.0 range of +4.35V<VIN<+5.5V), the circuit provides a boost mode +6V output for zero load, a buck mode constant-current (VBATT loaded) with 475 mA average input current-limit, and the buck mode boosts output current to up to 750 mA. For AC Adapter mode input (VIN>5.5V), the circuit operates in "pass-through" mode with current limit set to 1 A. As mentioned above, the circuit provides optional external USB/AC mode selection via D+/D− pins. Finally, the circuit may include a high-efficiency 2 MHz current-mode buck/boost (i.e., step-up/step down) switching regulator as describe above.

The example circuit of FIG. 9 is an input/output current-limited buck-boost regulator and "pass-through" switch that may be used as a "pre-regulator" for Li-Ion battery charging circuits. It automatically detects in the input type and operates in one of three modes, buck, boost, or pass-through. These three modes are designed to allow the circuit to supply the optimum voltage/current to a downstream Li-Ion pulse charging circuit that runs at a nominal 1 Hz switching frequency. When the input is below +2.7V the circuit may enter a undervoltage lockout (UVLO) mode and there is no output present. As the input rises above +2.7V (but below +5.75V) the output automatically goes into "boost mode" and outputs a fixed +6.0V in an expected zero DC load. If the output load (battery) is connected and the load current rises above 10 mA the output will drop to the battery voltage (+3.6V nominal) and after 10 cycles of the switching regulator switching signal (e.g., 5 us), the circuit will move into "buck mode". In buck mode the circuit will attempt to provide a constant current to the output at the nominal output voltage (VBATT). This constant output current is limited by the average input current of 475 mA and the Vin/Vout ratio. Typically this will result in significant current multiplication and higher output charge currents. If the load (battery) is disconnected, the circuit moves back in to "boost mode" and outputs +6.0V at zero load. The 475 mA average input current limit meets USB2.0 specifications. In the case where the input rises above +5.75V (AC/DC adapter) the circuit moves into "pass-through" mode and operates as a DC switch. The output voltage is equal to the input voltage (minus the 0.5V DC drop if there is heavy load, e.g., 500 mA). Current is limited to 100 mA (unless limited otherwise by AC/DC adapter). Additionally, as described below, this mode may be "latched" and the device will not go back into buck/boost mode unless the input/output voltage drops below UVLO or +2.7V. The circuit can also detect the presence of a current limited AC Adapter using the D+/D− input detection pins. When this detection is activated the "pass-through" mode can be enabled even when the input is less than +5.75V. The circuit in this example operates over wide +4.35V to +20V input range, and may be designed to include short circuit, thermal, and undervoltage protection.

Compact chip-scale packaging, high frequency operation, and integrated power FETs contribute to reducing the size and cost. For example, the circuit 910 may be packaged in an lead-free CSP-9 package and rated over the −30 C to +85 C temperature range, for example.

Figure 10:
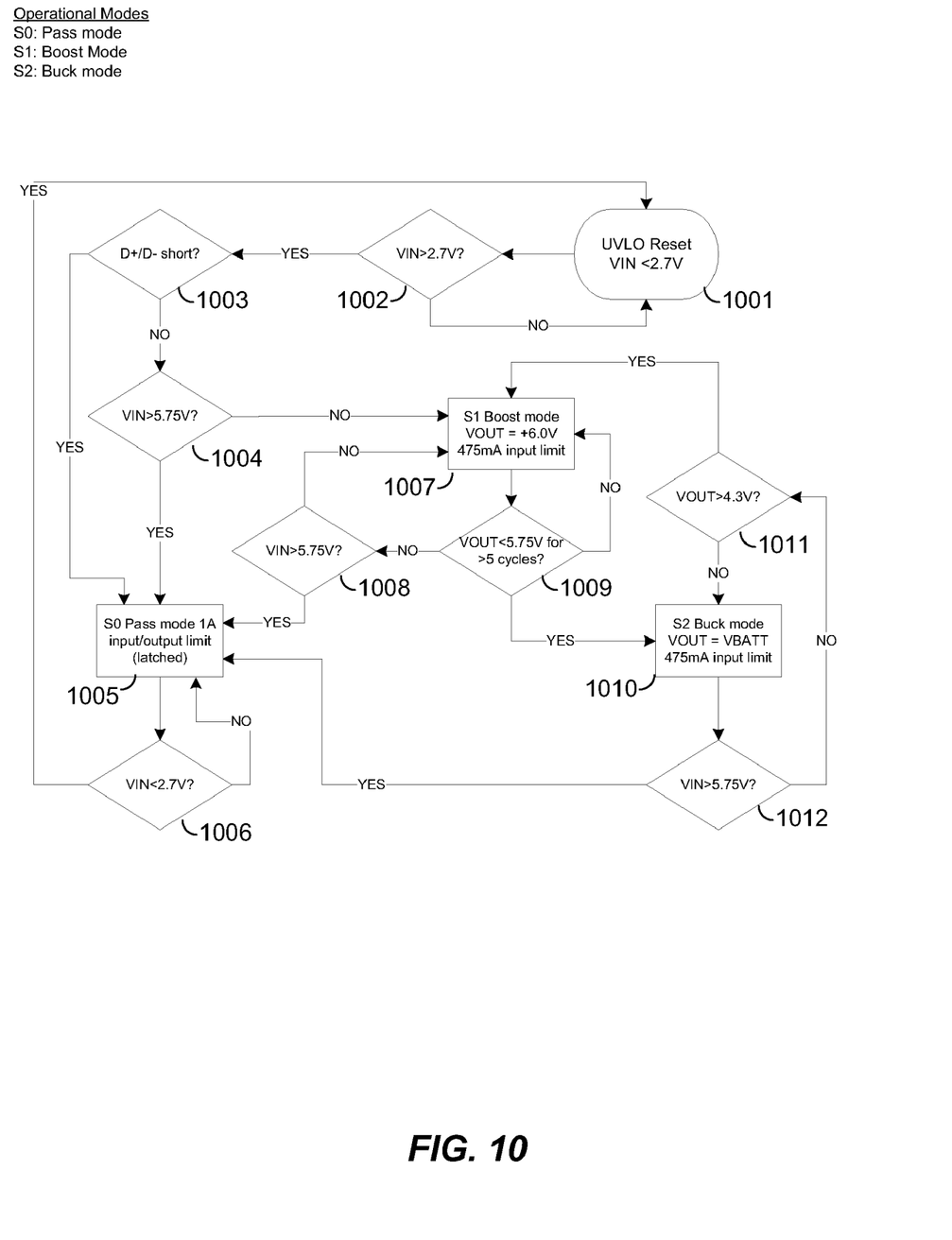
FIG. 10 illustrates a method of charging a battery according to another embodiment of the present invention.

FIG. 10 illustrates a method of charging a battery according to another embodiment of the present invention. At 1001, the circuit starts in undervoltage lockout (UVLO) when the input is less than 2.7 volts. At 1002, the circuit detects if the input voltage is above 2.7 volts. If yes, then the circuit detects if there is a short circuit between the D+ and D− pins at 1003. If there is a short circuit, the circuit transitions to 1005 described below, which provides for charging off an AC adapter. If there is not a short of the D+ and D− pins, then the circuit detects if the input voltage is above 5.75 volts at 1004. If the input voltage is above 5.75 volts, then the circuit enters a pass mode, which is latched so that if the voltage drops below 5.75 volts (e.g., when the pulse circuit connects the battery to the output of the regulator), the circuit will not change state. At 1006, the circuit detects for a UVLO condition where the input is below 2.7 volts. If UVLO is detected, the circuit returns to 1001. Otherwise, the circuit remains in pass mode, and charging from an AC Adapter may be carried out. Returning to 1004, if the input voltage is not above 5.75 volts, then the circuit knows it is being charged by a USB power source and enters boost mode at 1007. In boost mode, the output of the regulator is 6 volts as described above and an input current limit of 475 mA is set so the USB power source does not collapse. At 1009 the circuit waits 5 cycles of the switching signal and detects if the voltage is below 5.75 volts, indicating that the pulse circuit has connected the battery to the output of the regulator. If the input voltage is above 5.75 volts at 1009, the system may stay in boost mode at 1007, unless an increase in the input voltage above 5.75 volts is detected at 1008, in which case the circuit enters pass mode at 1005. If the input voltage drops below 5.75 volts at 1009, then the circuit enters buck mode at 1010 as described above. During buck mode, the circuit will continue to detect if the input voltage increases above 5.75 volts, in which case the circuit will transition to pass mode. If the input voltage increase above 4.3 volts, but not 5.75 volts, indicating that the USB power source is supplying power and that the pulse circuit has been turned OFF, then the circuit returns to boost mode. Therefore, when a USB power source is used, the battery may be charged using a pulse circuit and a switching regulator that transitions between buck and boost modes as the pulse circuit provides pulses of energy to the battery. The buck and boost mode operation allows the switching regulator in this example to provide more current to the battery than is available from the USB source, thereby improving the efficiency of battery charging.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, it is to be understood that some or all of the features, blocks, and components described above may be integrated on an integrated circuit. Based on the above disclosure and the following claims, other arrangements, embodiments, implementations and equivalents will be evident to those skilled in the art and may be employed without departing from the spirit and scope of the invention as defined by the claims. The terms and expressions that have been employed here are used to describe the various embodiments and examples. These terms and expressions are not to be construed as excluding equivalents of the features shown and described, or portions thereof, it being recognized that various modifications are possible within the scope of the appended claims.

What is claimed is:

1. A battery charging circuit comprising:
   a regulator having an input coupled to a power source;
   a detection circuit for detecting one or more characteristics of the power source, the detection circuit being coupled to the regulator for configuring the regulator into one of a plurality of modes; and
   a pulse circuit coupled between the regulator and a battery, wherein the regulator operates in a pass mode if a first power source type is detected, and wherein the regulator operates in a regulation mode if a second type of power source is detected.

2. The circuit of claim 1 further comprising a current limit circuit, wherein, in pass mode, a current limit is set above a maximum current output of the power source, and wherein, in regulation mode, the current limit is set below the maximum current output of the power source.

3. The circuit of claim 1 wherein the regulation mode comprises a buck mode and a boost mode.

4. The circuit of claim 1 wherein the regulator is a switching regulator.

5. The circuit of claim 4 wherein, in regulation mode, the switching regulator is configured in a buck mode if a pulse is being generated.

6. The circuit of claim 4 wherein, in regulation mode, the switching regulator is configured in a boost mode if a pulse is not being generated.

7. The circuit of claim 4 wherein a voltage on an output of said switching regulator alternates between a first voltage greater than a power source voltage and a second voltage on the battery.

8. The circuit of claim 4 wherein, in regulation mode, the detection circuit determines if a voltage on the output of the switching regulator is greater than a voltage on the input of the switching regulator.

9. The circuit of claim 4 wherein, in regulation mode, the switching regulator generates a constant current into the battery when the pulse is being generated.

10. The circuit of claim 1 wherein the regulator is a linear regulator.

11. The circuit of claim 1 wherein the detection circuit compares a power source voltage to a threshold voltage.

12. The circuit of claim 1 wherein the detection circuit detects a short circuit between a first terminal and a second terminal.

13. A method comprising:
   determining if a maximum current output of a power source is above a threshold;
   configuring a regulator coupled to the power source, wherein the regulator is configured in a pass mode if the maximum current output is above the threshold, and wherein the regulator is configured in a regulation mode if the maximum current output is below the threshold; and
   generating pulses to a battery, wherein an output of the regulator is coupled to the battery when a pulse is being generated, and the output of the regulator is decoupled from the battery when a pulse is not being generated.

14. The method of claim 13 wherein configuring the regulator comprises setting a current limit in the regulator above the maximum current output in pass mode, and setting the current limit in the regulator below the maximum current output in regulation mode.

15. The method of claim 13 wherein the regulator is a linear regulator.

16. The method of claim 13 wherein the regulator is a switching regulator.

17. The method of claim 16 wherein, in regulation mode, the switching regulator is configured in a buck mode if a pulse is being generated.

18. The method of claim 16 wherein, in regulation mode, the switching regulator is configured in a boost mode if a pulse is not being generated.

19. The method of claim 16 wherein a voltage on an output of said switching regulator alternates between a first voltage greater than a power source voltage and a second voltage on the battery.

20. The method of claim 16 further comprising, in regulation mode, detecting if a voltage on the output of the switching regulator is greater than a voltage on the input of the switching regulator.

21. The method of claim 16 wherein, in regulation mode, the switching regulator generates a constant current into the battery when the pulse is being generated.

22. The method of claim 13 wherein said determining step comprises comparing a voltage from the power source to the threshold, and wherein the threshold is a voltage.

23. The method of claim 13 wherein said determining step comprises detecting a short circuit between a first terminal and a second terminal.

24. The method of claim 13 wherein a voltage on an output of said regulator alternates between a power source voltage and a voltage on the battery.

25. The method of claim 13 further comprising sensing an output voltage at an output of the regulator, and generating said pulses when a voltage is sensed.

* * * * *